(12) United States Patent
Gardos et al.

(10) Patent No.: US 6,263,020 B1
(45) Date of Patent: Jul. 17, 2001

(54) METHOD AND APPARATUS FOR BIT RATE CONTROL IN A DIGITAL VIDEO SYSTEM

(75) Inventors: Thomas R. Gardos, Portland, OR (US); Karl O. Lillevold, Gjoevik (NO); Stephen Ing; Doug Brucks, both of Beaverton, OR (US); Michael J. Gutmann, Hillsboro, OR (US); Key Phomsopha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/773,043

(22) Filed: Dec. 24, 1996

(51) Int. Cl.[7] ................................................. H04N 7/12
(52) U.S. Cl. .................................. 375/240.03; 348/419.1
(58) Field of Search .................................. 348/419, 405, 348/400, 406, 414, 417, 418, 419.1; 375/240.02, 240.03, 245; 382/251

(56) References Cited

U.S. PATENT DOCUMENTS

| 5,038,209 | * | 8/1991 | Hang ..................................... 348/419 |
| 5,412,431 | * | 5/1995 | Vogel .................................... 348/405 |
| 5,459,515 | * | 10/1995 | Chevance et al. .................... 348/419 |
| 5,489,943 | * | 2/1996 | Kutner .................................. 348/405 |
| 5,691,770 | * | 11/1997 | Keesman et al. ..................... 348/405 |
| 5,710,595 | * | 1/1998 | Hang et al. ........................... 348/419 |
| 5,777,680 | * | 7/1998 | Kim ...................................... 348/405 |

OTHER PUBLICATIONS

Chen et al, "A self–governing rate buffer control strategy for pseudoconstant bit rate video coding", IEEE Transaction on Image Processing, vol. 2, Iss. 1, Jan. 1993, pp. 50–59.*

Video CODEC Test Model, TMN5; ITU Telecommunication Standardization Sector Study Group 15, Working Party 15/I Expert's Group on Very Low Bitrate Visual Telephony,; Source: Telenor Research (TR); Jan. 31, 1995.

ITU–T, Video Coding for Low Bitrate Communication, Draft H.263, Dec. 5, 1995.

ITU–T, Video CODEC for Audiovisual Services at p×64 kbits, H.261, Mar., 1993.

\* cited by examiner

*Primary Examiner*—Vu Le
(74) *Attorney, Agent, or Firm*—Kenyon & Kenyon

(57) ABSTRACT

In a video image compression and transmission system, quantization parameters for a block transform based video compression algorithm can be controlled by a quantizer selector so as to control compressed video frame size. The selection of the appropriate quantization parameter for the nth macroblock of a current frame is based on the cumulative number of compressed bits appearing in the first n-1 macroblocks of a current frame and a previous frame. By controlling the quantization parameter is such a manner, the overall system reacts more quickly to changes in complexity in the video sequence and allocates bits more accurately to different parts of the video frame according to a past history of bit allocation. To efficiently utilize the bandwidth of a transmission medium (such as POTS), a bit count of the contents of the transmit buffer is sent to a buffer regulator in a video controller where it is compared to a low water mark threshold. If the bit count falls below the threshold, an uncompressed video frame is scheduled for compression by a video compressor. By using the low water mark threshold, latency in the overall system is reduced and an efficient use of transmission medium bandwidth is achieved.

13 Claims, 7 Drawing Sheets

METHOD AND APPARATUS FOR BIT RATE CONTROL IN A DIGITAL VIDEO SYSTEM

BACKGROUND OF THE INVENTION

The present invention pertains to a method and apparatus for the compression and transmission of video data. More particularly, the present invention pertains to regulating a transmit buffer in a transmission subsystem and a quantizer selector in a digital video system environment.

A video compression/transmission system that is known in the art is shown in FIG. 1. A camera 11 is provided that generates video image data for a video capture component 13. The video capture component 13 "captures" the video image data from the camera one frame at a time in a known manner and at a predetermined rate (e.g., approximately 30 frames per second). The video capture component 13 transfers the video frame data to a video compressor 15 which may compress the video image data for the frame according to a bit-rate control algorithm. Such a bit-rate control algorithm typically includes a compression algorithm such as any of a variety of block transform based video compression algorithms such as H.261 (International Telecommunication Union—Telecommunications Standardization Sector ("ITU-T"), March, 1993), H.263 (ITU-T, Dec. 5, 1995), JPEG ("Joint Photographic Expert Group")(International Organization for Standardization/International Electrotechnical Commission ("ISO/IEC") 10918-1), MPEG-I and MPEG-II ("Motion Picture Expert Group")(ISO/IEC 11172-2 and 13818-2). The compressed video frame data is then sent to a transmitter 19 via a video controller 17, and the data is stored temporarily in a transmit buffer 20 under the control of a buffer regulator. The transmitter 19 then pulls data from the transmit buffer sequentially and adds the appropriate protocol information and transmits the data to a transmission medium 21 (e.g., POTS (Plain Old Telephone Service)).

In systems, such as ProShare® systems and Intel Smart Video Recorder® systems (Intel Corporation, Santa Clara, Calif.), the bit rate control algorithm of compressor 15 operates separately from the transfer of data from transmit buffer 20 to transmission medium 21 by the buffer regulator. Because of this separation, the operation of the bit rate control algorithm can only estimate the state of the transmit buffer 20 (i.e., how much data is contained in the transmit buffer 20). Also, the buffer regulator of the transmitter 19 typically requires that the video compressor 15 produce the same amount of compressed data for each frame. This separation leads to inaccuracies in that the transmit buffer 20 is incorrectly filled (i.e., not filled with enough data which reduces the frame rate over the transmission medium 21 or filled with too much data causing delay or latency).

SUMMARY OF THE INVENTION

According to a first embodiment of the present invention, the video compressor receives a succession of video frames, each frame including uncompressed video frame data divided into N macroblocks, where each macroblock defines a spatial area of each of the frames. The video compressor compresses a macroblock of video frame data based on a quantization parameter, which is supplied by a quantizer selector of a bit rate controller. The quantizer selector calculates the quantization parameter for an nth one of the macroblocks of a current video frame based on a cumulative amount of compressed video image data generated for the first n-1 macroblocks of the current frame and a previous frame. Since the quantization parameter has a direct effect on the number of compressed bits generated per macroblock, the bit rate controller can control the total number of compressed bits generated for a frame on a macroblock-by-macroblock basis.

According to a second embodiment of the present invention, a video compressor generates compressed video frame data to be sent to a transmit buffer (which, in turn, are sent over a transmission medium). The video compressor operates under the control of a buffer regulator of the bit rate controller which schedules the compression of video frames captured by a video capture component coupled to the video compressor. When the number of bits remaining in the transmit buffer falls below a threshold, the buffer regulator schedules a compression of a new frame from the video capture component. In this manner, the effective bandwidth of the transmission medium is used efficiently in that compressed video frame data is sent to the transmit buffer as the data is needed.

DETAILED DESCRIPTION

Figure 1:
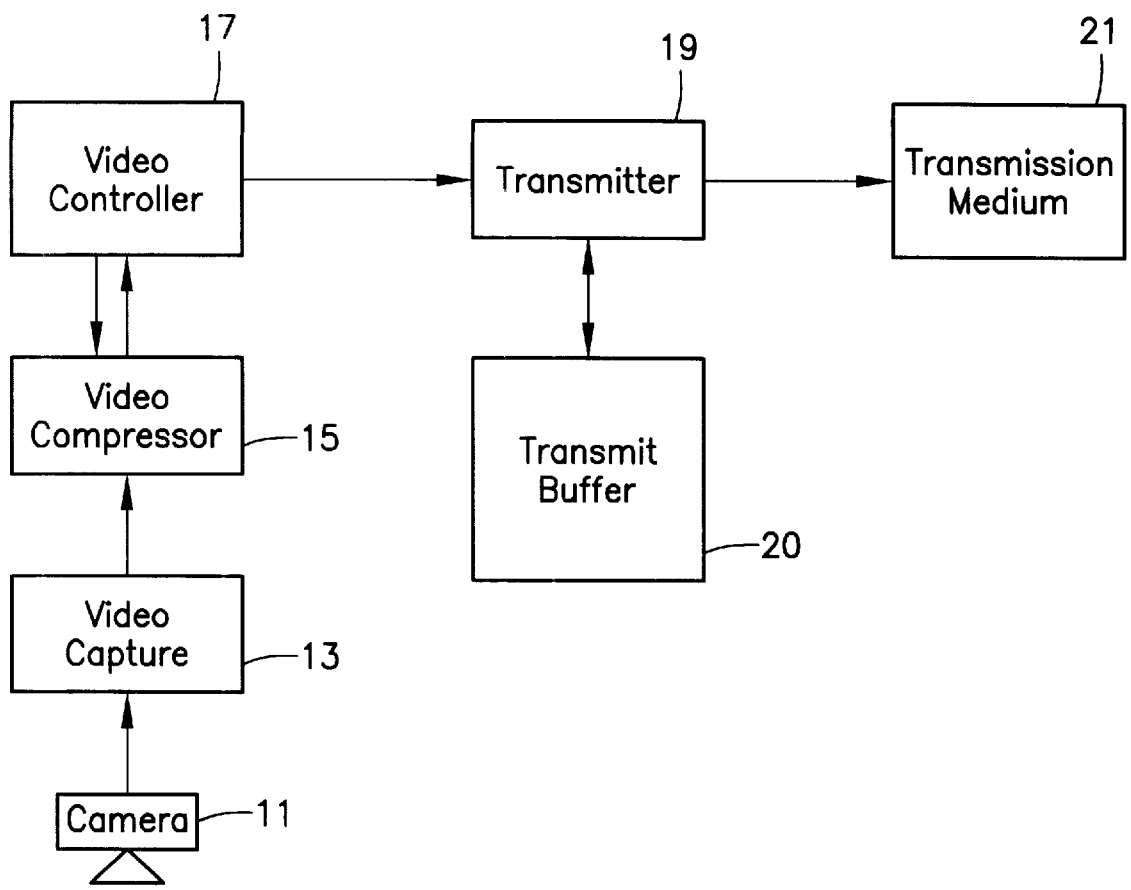
FIG. 1 is a block diagram of video compression and transmission system that is known in the art.
Figure 2:
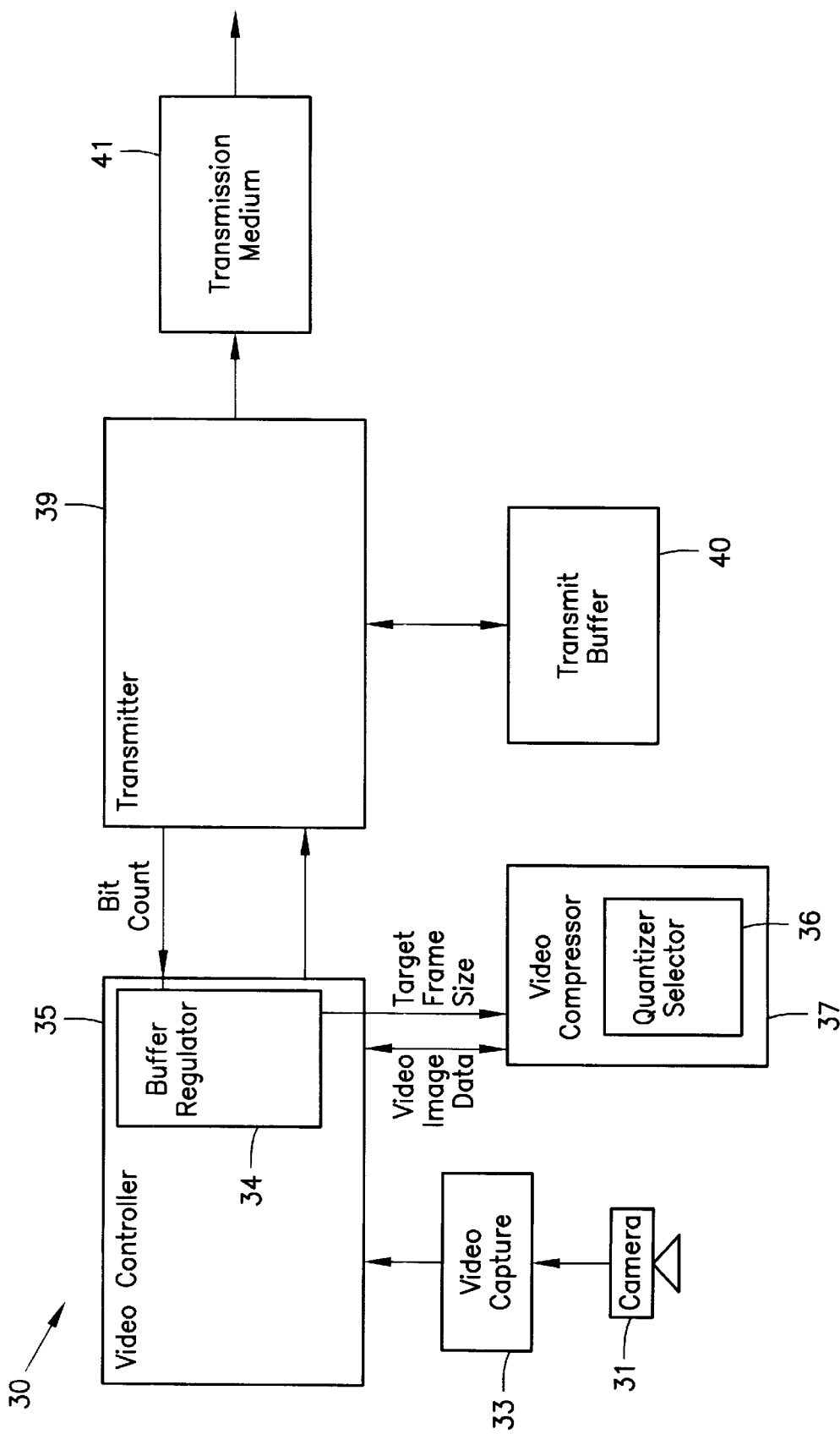
FIG. 2 is a block diagram of a video compression and transmission system constructed according to an embodiment of the present invention.

Referring to FIG. 2, a block diagram of a video compression and transmission system 30 including an embodiment of the bit rate controller of the present invention is shown. In this example, the bit rate controller can include a buffer regulator 34 (in a video controller 35) and a quantizer selector 36 (in a video compressor 37). As in FIG. 1, a camera 31 is provided which supplies video image data to a video capture component 33. The video capture component supplies video image data at a rate of approximately 30 frames per second (FPS) to the video controller 35. The video controller 35 via the buffer regulator 34 schedules the compression of video image data from the video capture component 33 by supplying it to a video compressor 37. The video compressor 37 then compresses the video image data under the control of the quantizer selector 36. The compressed video image data is then supplied by the video controller 35 to a transmitter 39 which stores this data in a transmit buffer 40. Compressed video data is then pulled from the transmit buffer 40 and sent to a transmission medium 41 such as a Plain Old Telephone Service (POTS).

In an example of the present invention using POTS, the bandwidth of the phone lines is limited to approximately 25–28 kilobits per second (kbps). Due to limitations in the bandwidth of the transmission medium, video image data is most often transmitted at less than the video capture rate of 30 FPS. Accordingly, not every frame of video image data generated by the video capture component 33 is compressed by the video compressor 37 (i.e., not every frame of video image data is scheduled to be compressed by the video controller 35). Given the bandwidth limitations of the transmission medium 41, the system 30 attempts to operate at a target frame rate (i.e., the number of frames of compressed video image data sent over the transmission medium each second). For this example, it is assumed that the target frame rate for the system 30 is 5 FPS. Given that there is 25–28 kbps bandwidth over the transmission medium 41, it is assumed that 20 kbps is available for video data generated by the system 30. Accordingly, the video controller 35 has a target frame rate of 5 FPS and a bandwidth of 20 kbps, which leads to an average of 4 kbits of compressed video data for each frame sent over the transmission medium (i.e., 20 kilobits/sec÷5 frames/sec=4 kilobits/frame). Under the control of the quantizer selector 36, the video compressor 37 will attempt to compress video frame data from the video capture component 33 to a target frame size of 4 kbits. The compressed video data is then sent by the video controller 35 to the transmitter 39 and placed in the transmit buffer 40. The quantity of data contained in the transmit buffer 40 (e.g., measured in bits or bytes) is supplied to the buffer regulator 34 of the video controller 35 as the value, Bit Count (either periodically or in response to a query by the video controller 35) in this example. The buffer regulator 34 compares the Bit Count to a threshold value or "Low Water Mark" and schedules another frame of video data from the video capture component 33 to be compressed by the video compressor 37 when Bit Count is less than the threshold value. The low water mark value is high enough so that by the time all of the remaining bits have been drained from the transmit buffer 40, the video compressor 37 will have finished compressing the next frame and is ready to place it in the transmit buffer 40.

If the transmitter 39 is transmitting compressed video data from the transmit buffer 40 to the transmission medium 41 at the expected rate of 20 kbps (in this example), and the video compressor 37 is returning compressed video frames of 4 kbits, then the target frame rate of 5 FPS will be achieved. However, the transmission bandwidth can vary (e.g., when there is no audio data being transmitted over the transmission medium 41, more bandwidth is available for video data) and the video compressor will most likely generate compressed video frames that contain approximately 4 kbits. In other words, the frame rate will vary around the target frame rate. If the video controller 35 detects that the transmit buffer is being drained at a rate different than originally specified (e.g., 20 kbps) over an extended period of time, then the video compression and transmission system 30 can recalculate a target frame size based on the new transmission bandwidth to maintain the same frame rate, and can vary the low water mark to minimize latency.

Figure 3:
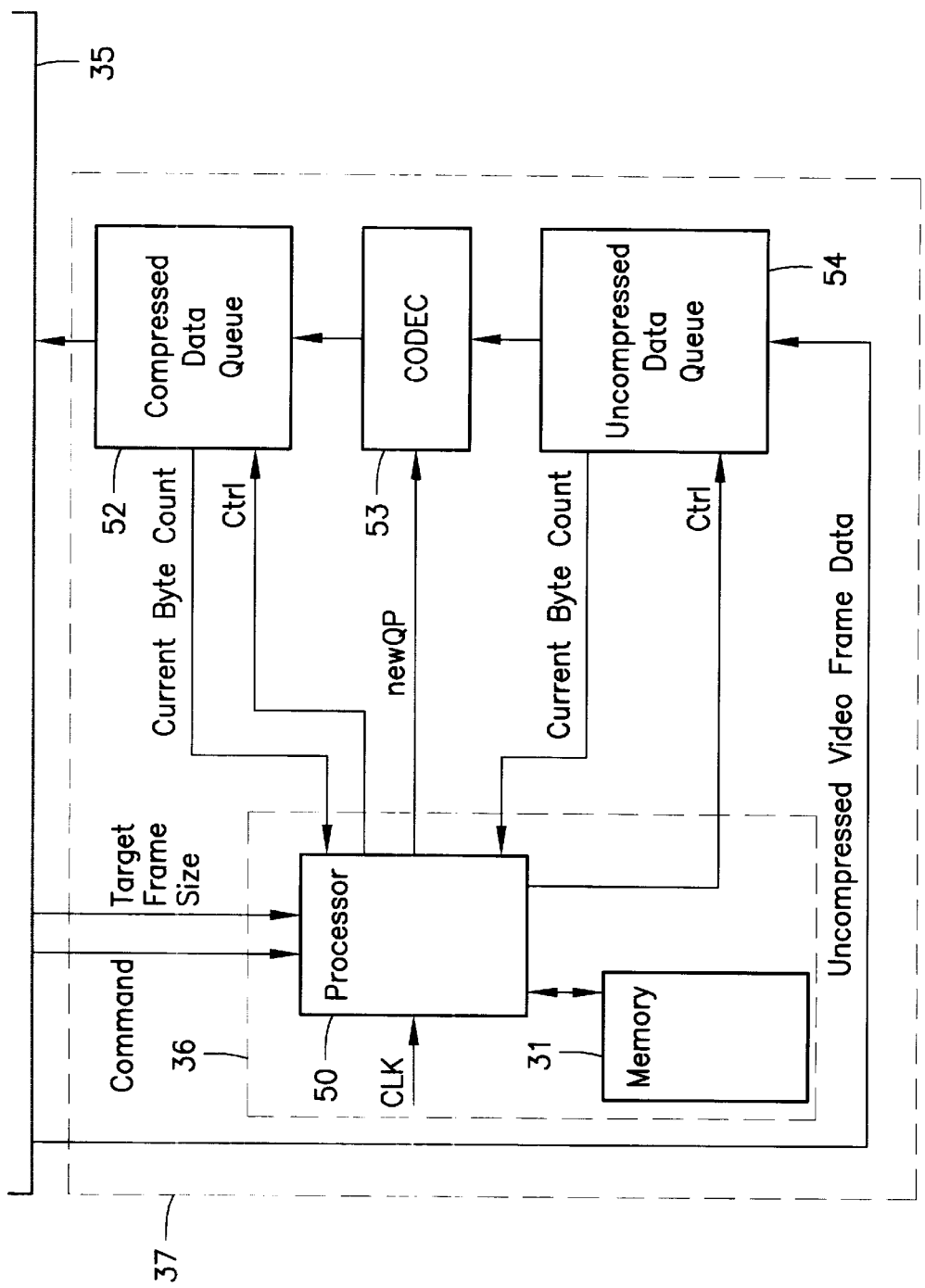
FIG. 3 is block diagram of a video controller and video compressor operated according to an embodiment of the present invention.

The operation of the video compressor 37 will be described with reference to FIG. 3. When compressing raw video data of a frame, the video controller 35 (via the buffer regulator) calculates the target frame size (i.e., target number of bits per frame) that corresponds to the target frame rate and the expected bandwidth. As in the example above, the target bits per frame is calculated by dividing the expected bandwidth with the target frames-per-second value. Accordingly, in this example, the video controller 35 will determine that the target bit rate is 4 kbits per frame. The video compressor 37 includes a coder/decoder (codec) 53 which employs a bit rate control algorithm on a per-frame basis to attempt to achieve the target frame size. Compression algorithms such as H.263, require that raw video data be divided into a plurality of rows of macroblocks. Each macroblock is of the same size (e.g., in the H.263, each macroblock has a size of 16 by 16 pixels).

The quantizer selector 36 includes a processor 50 that receives the target frame size from the buffer regulator 34 as well as command information (e.g., to schedule a frame compression). When the buffer regulator 34 schedules a frame to be compressed, it is sent to the video compressor 37 and can be stored in a uncompressed data queue 54. The data in queue 54 is sent to the codec 53 which compresses the video frame data under the control of the processor 50. According to an embodiment of the present invention, part of that control is the providing of a quantization parameter (newQP) to the codec 53.

The Quantization Parameter (QP) value in a hybrid Discrete Cosine Transform (DCT) compression algorithm can vary between a low value of 0 and a high value of 31 according to the H.263 specification. After the DCT is completed, the transformed coefficients are quantized with the QP value. How many bits are needed to transmit the quantized coefficients for a macroblock depends on the value of the QP. When the QP value is small, a large number of bits are usually needed. When the QP value is large, fewer bits are needed. Accordingly, the QP value has an inverse proportional effect on the number of compressed bits generated for each macroblock.

Figure 4A:
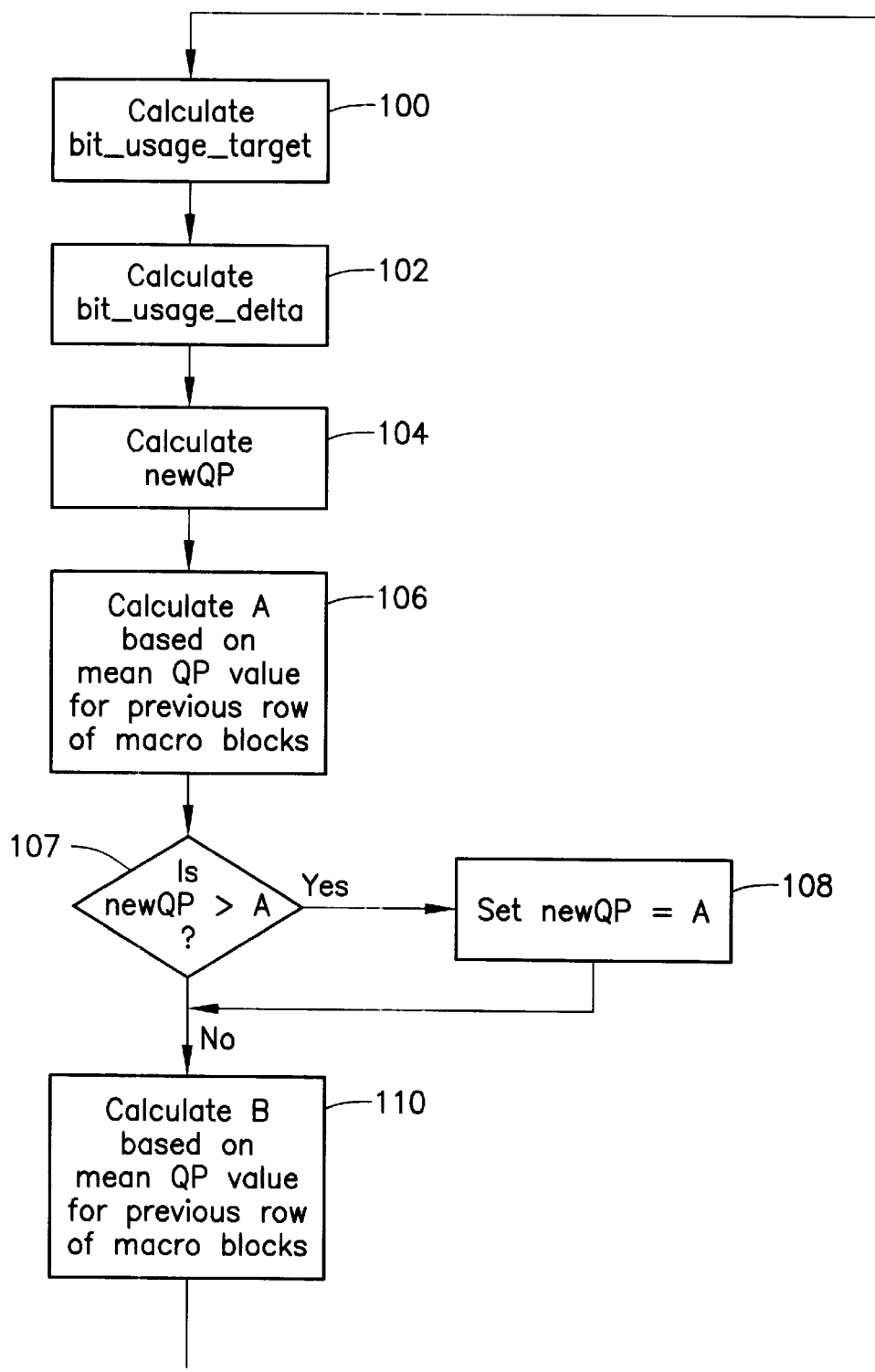
FIG. 4 is a flow diagram of an operation of a quantizer selector constructed according to an embodiment of the present invention.
Figure 4B:
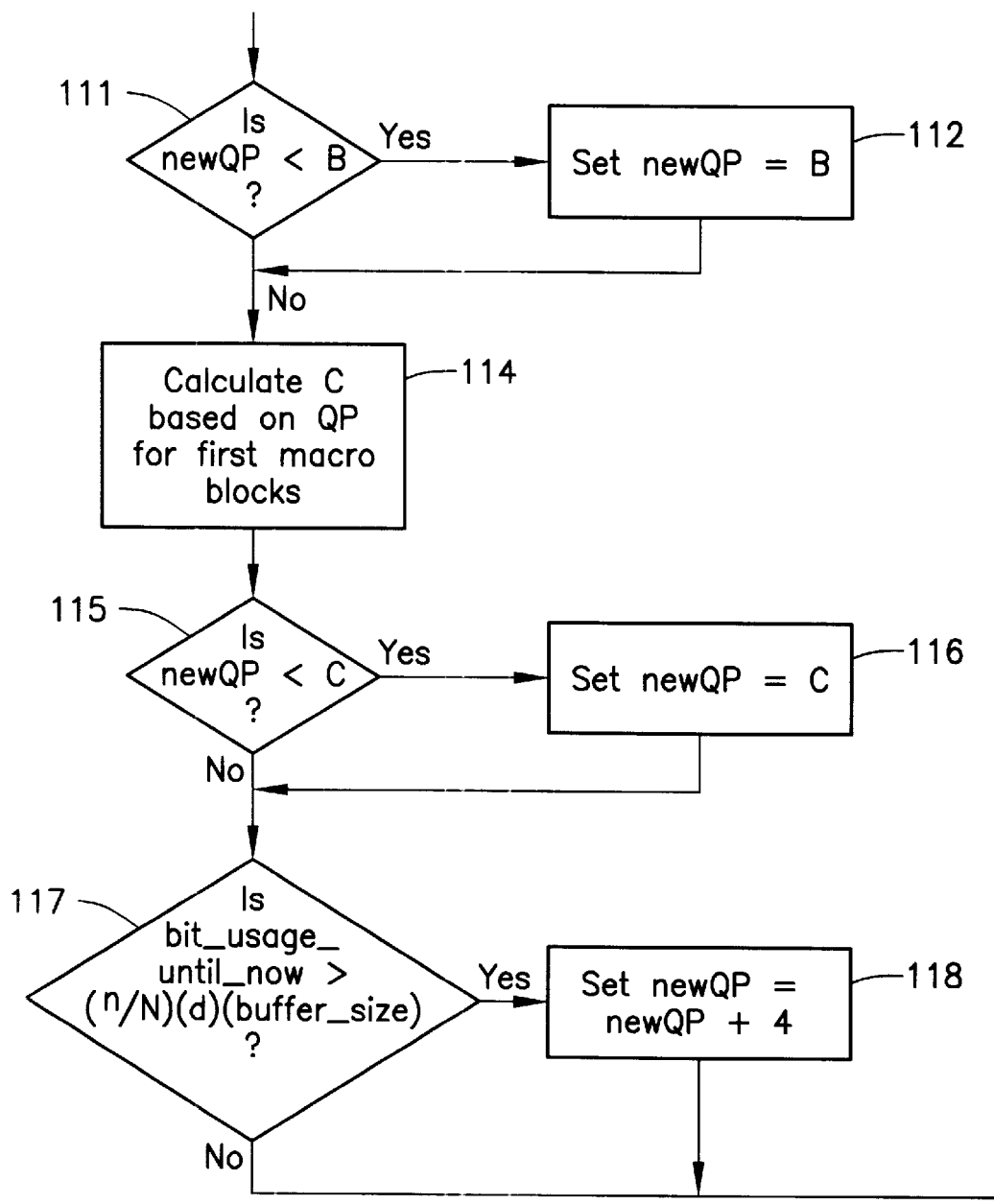

In this compression algorithm, it is assumed that consecutive frames in a video sequence will have similarities (e.g., similar backgrounds) and will have similar bit usage distributions. A goal of the compression algorithm is to match the bit usage distribution in the current frame with the previous frame. To avoid rapid fluctuations, and to handle scene changes, certain limitations will be applied. It is assumed that there are N macroblocks in a frame. Prior to encoding macroblock n of N, the following calculations are performed to determine the value for newQP to be used when encoding the nth macroblock. A flow diagram showing an exemplary method of setting the value for newQP is shown in FIG. 4. First, the target frame size is computed in the video controller 35 as discussed above:

$$\text{target\_frame\_size} = \text{bit\_rate}/\text{frame\_rate} \qquad \text{Eq. 1}$$

where target_frame_size would be 4 kbits in this example, bit_rate is nominally 20 kbps in this example, and frame_rate is 5 fps in this example. Also, the number of bits that should have been used up in encoding the first n macroblocks is calculated as follows (block 100):

$$\text{bit\_usage\_target} = (\text{prev\_bit\_usage}[n]/\text{prev\_bit\_usage}[N]) * \text{target\_frame\_size} \qquad \text{Eq. 2}$$

where bit_usage_target is a target value for the number of bits that have already been created for the current compressed frame (i.e., after encoding the first n−1 macroblocks), prev_bit_usage[n] is the cumulative number of bits used in the first n−1 macroblocks of the previous compressed frame, and prev_bit_usage[N] is the total number of bits used in the previous compressed frame. The previous bit usage array can be stored in a memory 51 in the quantizer selector 36.

As suggested in Video Codec Test Model, TMN5 (ITU-T, Study Group 15, Working Party 15/1, Expert's Group on Very Low Bitrate Visual Telephony (Jan. 31, 1995), the disclosure of which is hereby incorporated by reference in its entirety), the value for the first version of the QP value is selected according to Equations 3–6.

$$\text{bit\_usage\_delta} = \text{bit\_usage\_until\_now} - \text{bit\_usage\_target} \qquad \text{Eq. 3}$$

(block 102) where bit_usage_until_now is the total number of bits that have been used to compress the current frame up to the current macroblock. This value can be supplied by a compressed data queue 52 coupled to the output of the codec 53.

$$local\_adj = 12.0 * bit\_usage\_delta / (target\_frame\_size * target\_frame\_rate) \quad \text{Eq. 4}$$

$$global\_adj = (prev\_bit\_usage[N]-target\_frame\_size)/(2.0*target\_frame\_size) \quad \text{Eq. 5}$$

$$newQP = meanQP\_for\_previous\_picture*(1+global\_adj+local\_adj)+0.5 \quad \text{Eq. 6}$$

(block 104). The quantization parameter for the nth macroblock has a value between 0 and 31 according to the H.263 specification. The mean value for QP for the previous picture (frame) can also be stored in memory 51 of the quantizer selector 36.

According to an embodiment of the present invention, the quantization parameter is changed so as to control the size of the video frame data and the amount the quantization parameter can fluctuate is controlled to prevent degradations in quality. The quantization parameter can be controlled so that it is held between an upper and a lower limit for each row of macroblocks. For example, if the value for newQP, calculated above is greater than a selected term, A (see decision block 107), then newQP is set to A (block 108). Also, if newQP is less than a second selected value, B (see decision block 111), then newQP is set to B (block 112). The value for A can be selected based on the previous value for QP as shown in equations 7–10 (block 106).

$$newQP=1\rightarrow2: A=mean\_QP\_for\_previous\_row\_of\_macroblocks+1 \quad \text{Eq. 7}$$

$$newQP=3\rightarrow4: A=mean\_QP\_for\_previous\_row\_of\_macroblocks+2 \quad \text{Eq. 8}$$

$$newQP=5\rightarrow23: A=mean\_QP\_for\_previous\_row\_of\_macroblocks+3 \quad \text{Eq. 9}$$

$$newQP=24\rightarrow31: A=mean\_QP\_for\_previous\_row\_of\_macroblocks+4 \quad \text{Eq. 10}$$

The value for B can be selected based on equation 11 (block 110):

$$B=mean\_QP\_for\ previous\_row\_of\_macroblocks-2 \quad \text{Eq. 11}$$

In this example, using equations 6–11, the quantization parameter is prevented from increasing more than four quantization values over one row of macroblocks and is prevented from decreasing more than two quantization values over a row of macroblocks (as compared to the mean quantization parameter value for the previous row of macroblocks). This way the system reacts more quickly to increases in complexity in the video sequence. Thus, large fluctuations in the QP value are reduced in the video frame currently being compressed, which would degrade quality. By controlling the quantization parameter in such a manner, the system allocates bits more accurately to different parts of the video frame according to a past history of bit allocation. As with other values described above, mean QP values for previous rows of macroblocks can be stored in memory 51 of the quantizer selector 36.

The value for newQP can be set to a selected value C (block 116), if newQP is less than C (see decision block 115), where $$C=2/3*startQP \quad \text{Eq. 12}$$

(block 114) where startQP is the QP for the first macroblock calculated as:

$$startQP=meanQP\_for\_previous\_picture*(1+global\_adj)+0.5 \quad \text{Eq. 13}$$

Limiting the value of newQP so that it never decreases below 2/3 of the average of all quantization parameters for the previous frame prevents an excessively large frame size (e.g., having a number of compressed bits far in excess of the target frame size) and large fluctuations in the QP value from video frame to video frame which can also degrade quality.

It is essential that the bit count for the frame currently being compressed does not exceed the allocated buffer size for the codec 53 (as specified by the block transform based video compression algorithm specification, such as the H.263 specification). If it does, then there is a possibility that the codec 53 (storing buffer_size bits) will overflow resulting in lost video frame data. Accordingly, if bit_usage_until_now>(n/N)*D*buffer_size (see decision block 117), then newQP is set to the selected value of E (block 118). In this example, E is newQP+4 and D is 0.75.

The target frame size in kbits can be changed by the buffer regulator 34 to compensate for the ability of the video system to fill the bandwidth of the transmission medium 41. Prior to sending a frame of compressed data to the transmitter 39 (or after a number of compressed frames are sent), the Bit Count value can be checked from the transmitter 39. At this time, the target_frame_size ("TFS") is multiplied by a TFS adjustment variable (TFSadj) which can have an initial value of 1.0. If the Bit Count value has gone to zero at the time it is checked, the frames that are being sent may be too small. This is checked by keeping track of whether a compression is skipped because the video compressor 37 is busy at the time. This essentially means that if a compression is skipped because the video compressor 37 is not finished compressing the previous frame, and the subsequently compressed frame is sent on a Bit Count of 0, the system 30 is not able to compress video frame data fast enough. Therefore, the target_frame_size variable should be increased by raising the TFSadj variable by an increment (TFSadjInc) (e.g., 0.01). So that target frame size does not become excesseive, a maximum for TFSadj can be set to 2.0. Another reason for changing the target_frame_size value is when every video frame being captured by the video capture component is being compressed, but the Bit Count value is 0 before the next frame of compressed video data is sent to the transmitter 39. This may be an indication that the capture rate may be too slow for the target frame size. To correct this, the target_frame_size variable is decremented by decreasing the value for TFSadj by the value TFSadjDec (e.g., 0.03). The target frame size adjustment value can have a minimum value of 1.0.

Whether the compressor 37 is to compress a video frame from the video capture component 33 can be based on a comparison between the Bit Count value from the transmitter 37 and the threshold value or "low water mark." The low water mark is just high enough so that by the time all remaining bits have been drained from the transmit buffer 40, the video compressor 37 will have finished compressing the next frame and is ready to place it in the transmit buffer 40. If the low water mark is too low, the buffer will be empty for some period of time before the next frame is finished compressing, and thus the bandwidth over the transmission medium 41 will be wasted. On the other hand, if it is too high, then the next frame of video will have sat in the transmit buffer 40 longer than necessary and thus latency will be added to the system 30.

To compute the threshold value (Low Water Mark or LWM), two values are used in this embodiment of the present invention. The first is the amount of time left before the video compressor 37 would be able to compress a raw video frame from the video capture component 33 if it did not compress the one currently available from the component 33 (i.e., the next send time (NST)). Since the amount of time varies for compressing an image an estimate can be used that is 20% greater than the average of the last y compressions. Accordingly, for a compress time ($CT_i$) for the ith frame, the current compress time (CCT) at the ith frame would be:

$$CCT_i=(CT_{i-y+1}+ \ldots +CT_{i-1}+CT_i)/y \qquad \text{Eq. 14}$$

If VCI is the video capture interval for the video capture component 33 (e.g., 1/29.97 fps or 33.37 ms) the estimate for the next sample time is computed as:

$$NST=VCI+1.2*CCT \qquad \text{Eq. 15}$$

It can be seen from the above, that the rate at which video frames are captured by the video capture component 33 has an effect on latency in the system 30. Thus, the faster that video frames are captured, the less time the video compressor 37 will be waiting for a raw video frame data from the video capture component 33.

The second value is the current bit rate (CBR) which is the rate at which bits of compressed data are being read from the transmit buffer 40. The CBR after the ith frame is computed as an average of the last z frames sent as:

$$CBR_i=(L_{i-z+1}/(T_{i-z+1}-T_{i-z})+ \ldots +L_{i-1}/(T_{i-1}-T_{i-2})+L_i/(T_i-T_{i-1}))/z \qquad \text{Eq. 16}$$

where $L_i$ is the length in bits of the ith compressed frame of video data and $T_i$ is a time stamp (in elapsed milliseconds) associated with frame i. Given these two values, the selection of a value for the low water mark threshold is:

$$LWM=NST*CBR \qquad \text{Eq. 17}$$

as system parameters change, such as transmission medium bandwidth and target frame rate, the LWM threshold may be changed to compensate for it. The LWM threshold can be adjusted after each frame (or after a set number of frames) by multiplying it with and LWM adjustment (LWMadj) which would have an initial value of 1. If the Bit Count from the transmit buffer 40 has gone to 0 before the next compressed frame is sent to the transmit buffer 40, then the LWMadj variable is modified adding an incremental value LWMadjInc (e.g., 0.01). If the Bit Count from the transmit buffer 40 has not reached 0 when the next compressed fame is sent to the transmit buffer 40, then the LWMadj variable is modified by subtracting a decremental value LWMadjDec (e.g., 0.001). By setting LWMadjInc to a value much greater than LWMadjDec, the system is able to react faster to increasing the LWM to avoid the Bit Count value from reaching 0 often. To minimize latency, LWM should be as low as possible. Using the LWMadj value as modified by LWMadjInc and LWMadjDec, the effect is that LWM will reach a state of equilibrium (i.e., going up and down in value by the same amount each period) and remain in equilibrium unless a change in the system shifts the LWM to another point (e.g., where video content begins to change extensively from frame to frame). To prevent the LWM from becoming too high, a maximum can be set for LWMadj (e.g., 2.0).

The buffer regulator 34 can also be used in controlling the generation of so-called PB-frames using the low water mark threshold. As detailed in the H.263 specification, a PB frame includes one P-frame which is predicted from the previously decoded P-frame and one B-frame which is predicted both from the previous decoded P-frame and the P-frame currently being decoded (thus, bidirectionally). If a B-frame is expected at the current compression time, that compression can be scheduled even if the Bit Count value is above the LWM threshold. This is because, even if the B-frame is compressed, it is not sent immediately (i.e., like a P-frame) since the encoder holds on to it and returns it with the appropriate P-frame as a PB-frame.

Figure 5A:
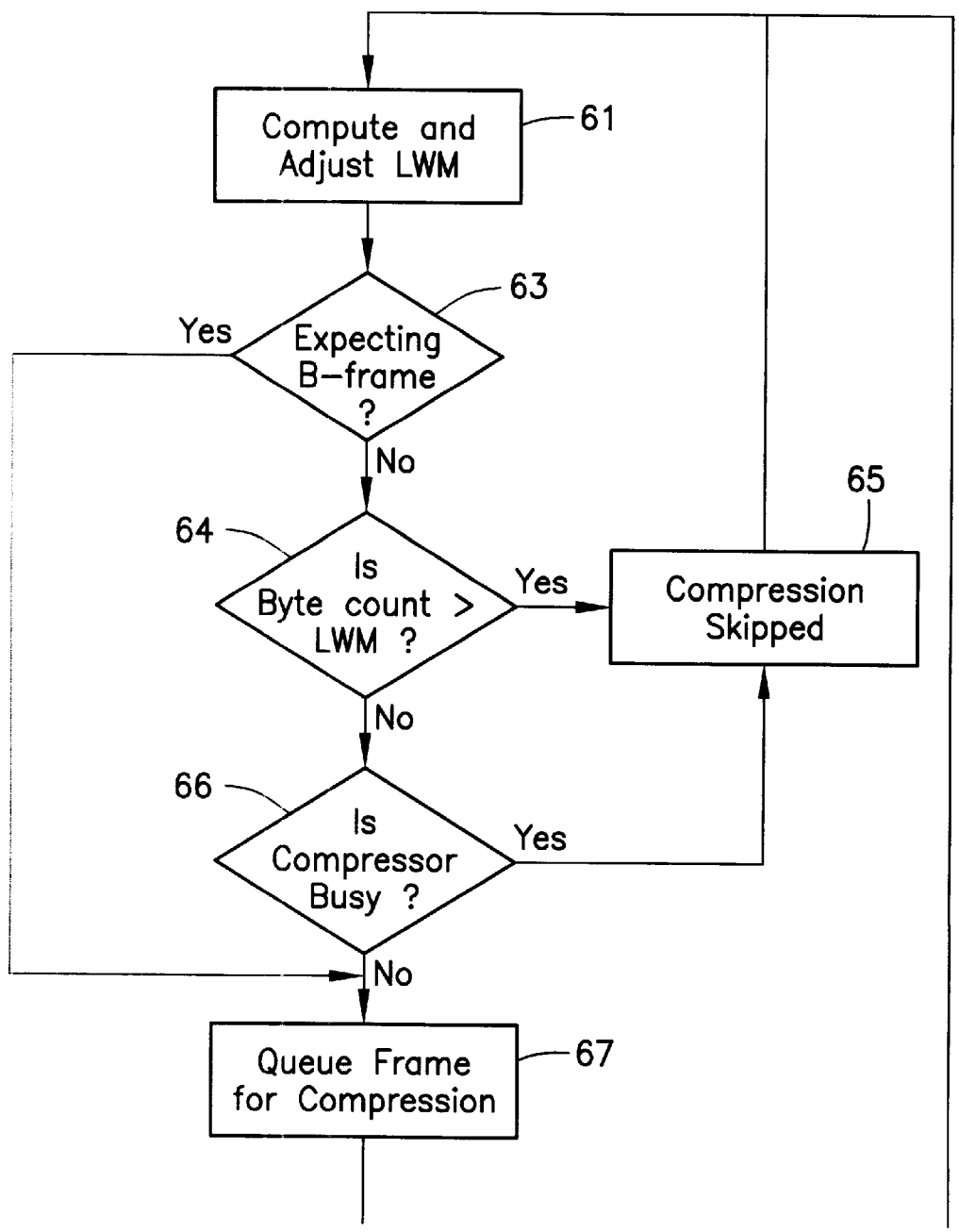
FIG. 5 is a flow diagram of an operation of a buffer regulator constructed according to an embodiment of the present invention.
Figure 5B:
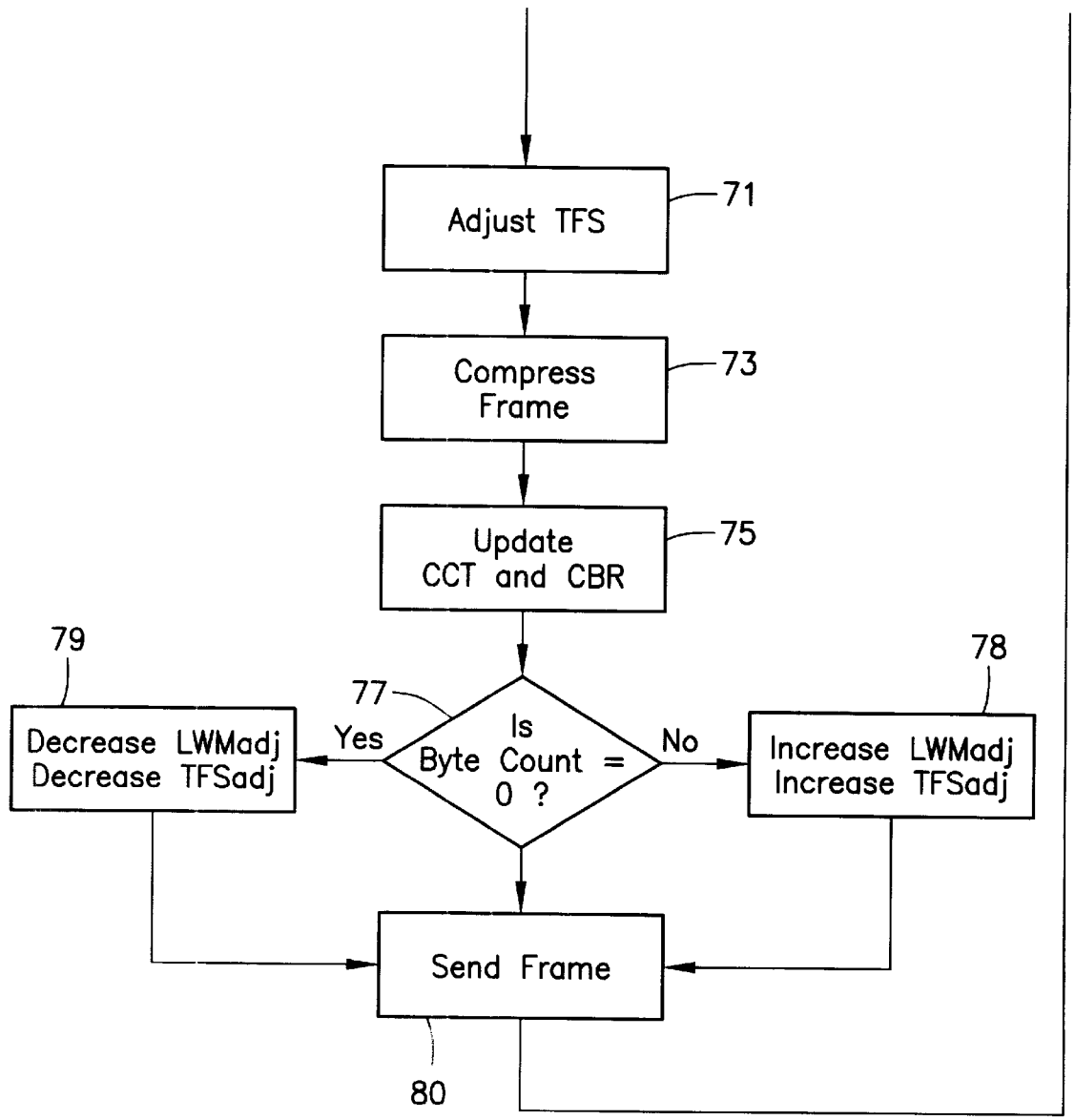

The operation of the buffer regulator 34 as it relates to the low water mark threshold and the target frame size is shown in FIG. 5 in flow diagram form. In block 61, the low water mark threshold is computed and adjusted as described above. If a B-frame is expected in decision block 63 control passes to block 67 where the next frame of video data is queued for compression (e.g., in queue 54 of FIG. 3). If a B-frame is not expected, then the Bit Count value is checked against the low water mark threshold (decision block 63) and the compression is skipped if the Bit Count value is too high (block 65). Otherwise, if the video compressor 37 is not busy (decision block 66), then the video frame data is queued for compression (block 67). In block 71, the target_frame_size variable is adjusted as described above and the video frame data is compressed by codec 53 (block 73). In block 75 the CCT and CBR value are updated and the Bit Count value is once again checked in decision block 77. If the Bit Count value is 0 then the LWMadj and TFSadj values are decreased (block 79), and if the Bit Count value is not 0, the same variables are increased (block 78). In block 80, the compressed frame data is sent to the transmit buffer 40 via the video controller 35 and control returns to block 61 to handle the next frame of video data.

With the video compression/transmission system of the present invention, an improved quality of video data is achieved in that the system adapts quickly to changing bandwidth at the transmission medium 41. If the video controller 35 detects that the transmit buffer is being drained at a rate that is different than originally specified over an extended period of time, then it can recalculate the target frame size based on the new transmission bandwidth to maintain the same frame rate, and can vary the "low water mark" threshold to minimize latency.

The present invention has been described with respect to a POTS transmission medium, however the embodiments of the bit rate controller described above can be used at a broad range of data rates. Although several embodiments are specifically illustrated and described herein, it will be appreciated that modifications and variations of the present invention are covered by the above teachings and within the purview of the appended claims without departing from the spirit and intended scope of the invention.

What is claimed is:

1. A video image compression and transmission system comprising:
   a video capture component for generating a video frame represented as N macroblocks, where N is a whole number;
   a video compressor coupled to said video capture component for compressing each of said macroblocks according to a quantization parameter;
   a quantizer selector coupled to said video compressor and for calculating said quantization parameter for an nth one of said macroblocks for the current frame based on an amount of compressed video image data generated for macroblocks of a previous video frame and an amount of compressed video image data generated for previous macroblocks of the current video frame and supplying said quantization parameter to said video compressor, where n is a whole number.

2. The system of claim 1 wherein said quantizer selector calculates said quantization parameter based further on a target frame size of compressed video image data for the current video frame.

3. The system of claim 2 wherein each of said current and previous video frames includes a succession of rows where each row includes a succession of macroblocks.

4. The system of claim 3 wherein said quantization parameter is prevented from falling below two-thirds of a mean value of said quantization parameter for the previous video frame.

5. The system of claim 3 where said quantization parameter is controlled such that for a current one of said rows, said quantization parameter is held between an upper and a lower limit.

6. The system of claim 1 wherein said quantization parameter for the nth one of said macroblocks based on a cumulative amount of compressed video image data generated for a first n−1 of said macroblocks of a previous video frame and a first n−1 of said macroblocks of the current video frame.

7. A video image compression and transmission system comprising:

a video capture component for generating a video frame represented as N macroblocks, where N is a whole number;

a video compressor coupled to said video capture component for compressing each of said macroblocks according to a quantization parameter;

a quantizer selector coupled to said video compressor and for calculating said quantization parameter for an nth one of said macroblocks according to macroblocks of a previous video frame and previous macroblocks of the current video frame and supplying said quantization parameter to said video compressor, where n is a whole number;

a transmit buffer for receiving compressed video data from said video compressor and outputting a byte count value indicating a number of bytes in said transmit buffer; and a video controller coupled to said video compressor, said video capture component and said transmit buffer, said video controller including a buffer regulator capable of scheduling a compression of an uncompressed video frame by said video compressor when said byte count value falls below a threshold value.

8. A video image compression and transmission system comprising:

a video capture component for generating a video frame including N macroblocks of video data, where N is a whole number;

a video compressor coupled to said video capture component for compressing each of said macroblocks according to a quantization parameter;

a transmit buffer for receiving compressed video data from said video compressor and outputting a bit count value indicating a number of bits in said transmit buffer; and a buffer regulator coupled to said video compressor and said transmit buffer for scheduling a compression of said video frame by said video compressor when said bit count value falls below a threshold value.

9. A method of compressing video frame data comprising:

(a) generating a succession of video frames at a video capture component, each of said video frames including uncompressed video data;

(b) dividing each video frame into a succession of N macroblocks where each macroblock defines a spatial area of one of said video frames, where N is a whole number;

(c) calculating a quantization parameter value for an nth one of said macroblocks of a current video frame based on an amount of compressed video image data generated for macroblocks of a previous video frame and an amount of compressed video image data generated for previous macroblocks of said current video frame;

(d) compressing said N macroblocks for said current frame into compressed video image data using a block transform based compression method based on said quantization parameter value.

10. A method of compressing video frame data comprising:

(a) generating a succession of video frames at a video capture component, each of said video frames including uncompressed video data;

(b) dividing each video frame into a succession of N macroblocks where each macroblock defines a spatial area of one of said video frames, where N is a whole number;

(c) calculating a quantization parameter value for an nth one of said macroblocks of a current video frame according to macroblocks of a previous video frame and previous macroblocks of said current video frame;

(d) compressing said N macroblocks for said current frame into compressed video image data using a block transform based compression method based on said quantization parameter value.

11. A method of compressing and transmitting video image data in a system including a transmit buffer adapted to receive compressed video image data from a video compressor, the method comprising:

generating a succession of video frame data, each frame including uncompressed video frame data divided into N macroblocks, where each macroblock defines a spatial area of each of said frames and N is a whole number;

outputting a byte count value from said transmit buffer to a video controller, said byte count value indicating a number of bytes in said transmit buffer;

scheduling a compression of one of said succession of video frames by a video controller when said byte count value falls below a threshold value;

compressing said video frame data in a video compressor; and transferring compressed video frame data from said video compressor to said transmit buffer.

12. The method of claim 11 further comprising:

modifying said threshold value based on said bit count value prior to said transferring step.

13. The method of claim 12 wherein in said modifying step, said threshold value is reduced if said bit count value prior to said transferring step is greater than zero.

* * * * *

UNITED STATES PATENT AND TRADEMARK OFFICE
CERTIFICATE OF CORRECTION

PATENT NO. : 6,263,020 B1
DATED : July 17, 2001
INVENTOR(S) : Gardos et al.

It is certified that error appears in the above-identified patent and that said Letters Patent is hereby corrected as shown below:

Column 6,
Line 3, "0.Eq. 13" should be -- 0.5 Eq.13 --
Line 40, "excesseive" should be -- excessive --

Signed and Sealed this

Fourth Day of June, 2002

Attest:

JAMES E. ROGAN
Attesting Officer
Director of the United States Patent and Trademark Office